US012561689B2

(12) United States Patent
Maniulit et al.

(10) Patent No.: US 12,561,689 B2
(45) Date of Patent: Feb. 24, 2026

(54) INTELLIGENTLY SELECTING MODELS FOR RESOLVING PENDING DEBIT TRANSACTION DISPUTES ACROSS COMPUTER NETWORKS

(71) Applicant: Chime Financial, Inc., San Francisco, CA (US)

(72) Inventors: Anthea Maniulit, Walnut Creek, CA (US); Austin Wang, Oakland, CA (US); Catherine Paulson, San Francisco, CA (US); Chris Marshall, Atlanta, GA (US); Clem Akomea-Agyin, Oakland, CA (US); Deivide Oliveira, Coquitlam (CA); Devadas Mallya, Mountain View, CA (US); Halfdan Hem, Ucluelet (CA); Hugh Bien, San Jose, CA (US); Jacqueline Chien, San Francisco, CA (US); Luca Pellicoro, San Francisco, CA (US); Marcus Vinson, Austin, TX (US); Kuan-Wen (Martin) Lo, Fremont, CA (US); Sally Eng, San Francisco, CA (US); Sarah Lin Baxter, Austin, TX (US); Siddhi Soman, San Francisco, CA (US); Steven Holinaty, Port Moody, CA (US); Yara Qattom, San Francisco, CA (US); Andrew MacIver, Oakland, CA (US)

(73) Assignee: Chime Financial, Inc., San Francisco, CA (US)

( * ) Notice: Subject to any disclaimer, the term of this patent is extended or adjusted under 35 U.S.C. 154(b) by 109 days.

(21) Appl. No.: 18/152,044

(22) Filed: Jan. 9, 2023

(65) Prior Publication Data
US 2024/0232900 A1 Jul. 11, 2024

(51) Int. Cl.
*G06Q 20/10* (2012.01)
*G06Q 20/38* (2012.01)
(Continued)

(52) U.S. Cl.
CPC ......... *G06Q 20/407* (2013.01); *G06Q 20/102* (2013.01)

(58) Field of Classification Search
CPC .............. G06Q 20/407; G06Q 20/102; G06Q 20/405
(Continued)

(56) References Cited

U.S. PATENT DOCUMENTS

| | | | | |
|---|---|---|---|---|
| 7,630,903 | B1 * | 12/2009 | Vaidyanathan | ........ G06Q 10/10 705/1.1 |
| 8,150,774 | B2 * | 4/2012 | Burchetta | .............. G06Q 20/42 705/80 |

(Continued)

OTHER PUBLICATIONS

Chime Credit Builder Secured Visa® Credit Card; A New Way to Build Credit; Retrieved from the Internet Dec. 21, 2022; URL: https://web.archive.org/web/20221221142350/https:/www.chime. com/credit-builder/.

*Primary Examiner* — Clifford B Madamba
(74) *Attorney, Agent, or Firm* — Keller Preece PLLC

(57) ABSTRACT
This disclosure describes a pending debit dispute resolution system that, as part of an inter-network facilitation system, can intelligently select models for resolving debit transaction disputes across computer networks while providing user interfaces and options for client devices to initiate debit transaction disputes when a debit transaction is in a pending state. For example, the pending debit dispute resolution system can receive and identify reported issue communications about debit transactions from client devices while debit transactions are pending. The pending debit dispute resolution system can identify issue classifications and monitor settlement computer networks to identify status change
(Continued)

classifications corresponding to the debit transactions. Based on the issue classifications and the status change classifications, the pending debit reported issue resolution system can select a dispute filing model/approach for resolving the reported issue communication.

20 Claims, 10 Drawing Sheets

(51) Int. Cl.
    *G06Q 20/40*        (2012.01)
    *G06Q 30/01*        (2023.01)
    *G06Q 30/014*      (2023.01)
    *G06Q 30/015*      (2023.01)
    *G06Q 40/02*        (2023.01)

(58) Field of Classification Search
    USPC .......................................................... 705/39
    See application file for complete search history.

(56)                    References Cited

U.S. PATENT DOCUMENTS

| | | | |
|---|---|---|---|
| 8,370,265 B2 * | 2/2013 | Coulter ................ | G06Q 20/108 |
| | | | 380/247 |
| 2002/0184123 A1 * | 12/2002 | Sijacic ................... | G06Q 30/04 |
| | | | 705/34 |
| 2013/0080318 A1 * | 3/2013 | Katz ...................... | G06Q 40/02 |
| | | | 705/39 |
| 2021/0390545 A1 * | 12/2021 | Martinez-Guarneros ................... | |
| | | | G06Q 20/389 |
| 2023/0259948 A1 * | 8/2023 | Paulson ................ | G06N 20/00 |
| | | | 705/44 |

* cited by examiner

| Classification 514 | Direct Dispute Filing Model | Client Confirmation Dispute Filing Model |
| --- | --- | --- |
| Unauthorized Transaction | All Other Cases | Change In Merchant Name |
| Non-Receipt Of Goods Or Services | N / A | All Cases |
| Transaction Canceled | N / A | All Cases |
| Credit Not Posted | N / A | All Cases |
| Duplicate Charge | N / A | All Cases |
| Incorrect Amount Charged | No Change In Amount | All Remaining Cases |
| Goods / Services Not As Described | N / A | All Cases |
| Paid For Goods / Services By Other Means | No Change In Amount Or Merchant Name | If There Is A Data Change |
| Merchandise Was Returned | N / A | All Cases |
| ATM Cash Not Received | No Change In Amount Or Merchant Name | All Remaining Cases |

Fig. 5

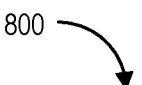
800
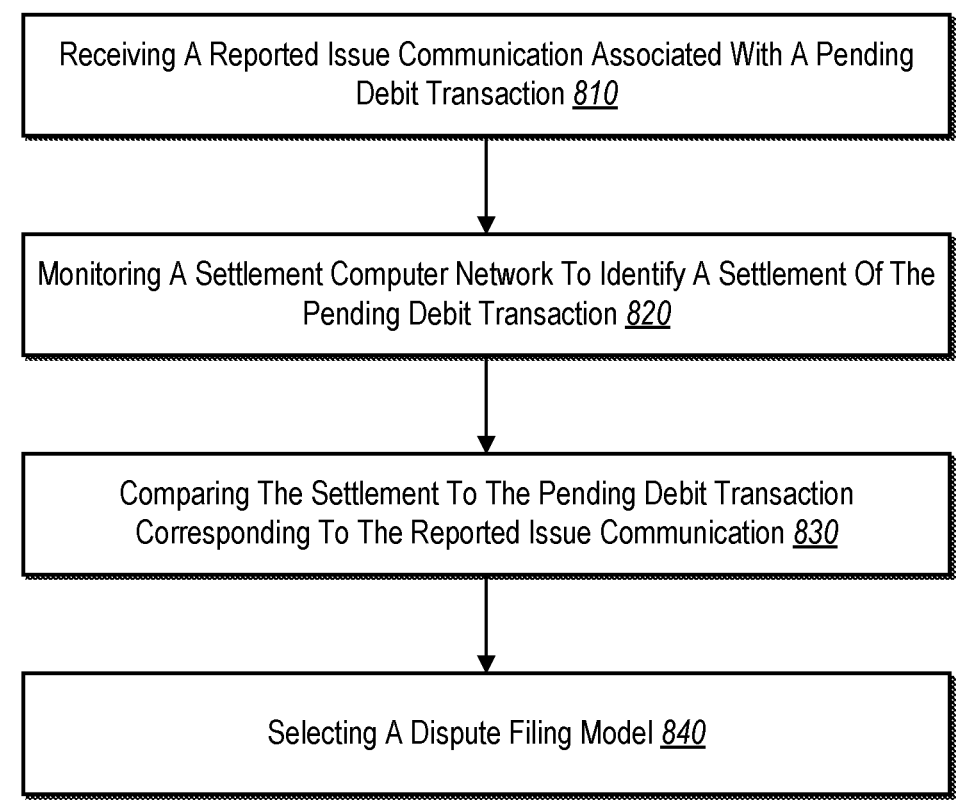
Receiving A Reported Issue Communication Associated With A Pending Debit Transaction *810*
Monitoring A Settlement Computer Network To Identify A Settlement Of The Pending Debit Transaction *820*
Comparing The Settlement To The Pending Debit Transaction Corresponding To The Reported Issue Communication *830*
Selecting A Dispute Filing Model *840*
*Fig. 8*

1000

Inter-Network Facilitation System
104

Network
1004

Third-Party System
1008

Client Device 1006

INTELLIGENTLY SELECTING MODELS FOR RESOLVING PENDING DEBIT TRANSACTION DISPUTES ACROSS COMPUTER NETWORKS

BACKGROUND

Recent years have seen significant developments in systems that utilize distributed computing resources to process large data volumes in generating and managing digital transaction information across computer networks. For example, conventional systems utilize a variety of computing devices to manage and track changes or updates to debit transactions from various payment computer networks. Although conventional systems utilize various computer-implemented algorithms to generate and manage digital transactions, conventional systems nevertheless suffer from a number of technical deficiencies, particularly with regard to computational efficiency, flexibility, and functionality.

As just suggested, some existing systems are inefficient. In particular, some systems waste computer processing resources and network bandwidth resources by requiring multiple client interactions to monitor and report debit transaction settlement and resolution status (e.g., to internal network components or to third-party systems). Indeed, to provide continual client device access to determine the debit transaction settlement status, many existing systems require additional processing and bandwidth resources. As the volume of disputed debit transactions increases, networks will necessarily grow larger and more distributed and the data streams across a growing number of networks will likewise increase in size (not only hampering efficiency, but also preventing scalability). By streaming such large numbers of requests, these conventional systems require substantial computer processing resources and network bandwidth capacity that might otherwise be reduced with a more efficient system.

As a contributing factor to their inefficiencies, some conventional systems are inflexible. To elaborate, many existing systems employ a rigid methodology to determine if a debit transaction dispute may be filed with the reporting agency. Often, systems require client devices to attempt to initiate debit transaction disputes multiple times before allowing the dispute to be filed successfully. Indeed, conventional systems utilize a one-size-fits-all approach to filing debit transaction disputes. For example, regardless of context, conventional systems provide a standard gatekeeping function that often requires the client device to make multiple attempts to file the debit dispute until all debit transaction settlement requirements are satisfied. Over large numbers of debit transaction disputes, this process of generating and broadcasting so many requests becomes computationally expensive and bandwidth consumptive. Thus, many conventional systems waste computer processing resources and network bandwidth by rigidly maintaining a one-size-fits-all approach to filing debit transaction disputes.

Due at least in part to their inflexible nature, many conventional debit transaction reporting systems provide limited functionality with regard to debit transaction dispute resolution. More specifically, some existing systems provide inconvenient and generic methods to display and gather debit transaction dispute requests from the client system and determine whether to initiate a debit transaction dispute. As an initial matter, conventional systems do not provide user interfaces or options to initiate a dispute for pending debit transactions. Conventional systems often require additional interactions with support devices running additional computer applications and resources to determine the status of a debit transaction dispute. Indeed, conventional systems fail to identify alternative methods for debit transaction dispute resolution and can require numerous attempts by the client device to resolve the dispute. Thus, many conventional systems waste computer processing resources and network bandwidth due to limited system functionality and lack of alternative processing options.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve computational efficiency, flexibility, and functionality by intelligently selecting between dispute filing models based on contextual features to resolve transaction disputes across computer networks and provide flexible options and interfaces to initiate debit dispute resolution processes even while the debit transaction is in a pending state. For example, the disclosed systems can select between dispute filing models based on issue classifications corresponding to a reported issue regarding a pending debit transaction as well as a status change classification resulting from settlement of the debit transaction. Moreover, the disclosed systems can provide options and interfaces for client devices to flexibly report issues about debit transactions while in a pending state. In addition, the disclosed systems can provide more efficient interactions to consolidate debit dispute resolution across computing devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description refers to the drawings briefly described below.

FIG. 5 illustrates selection of different dispute filing models based on issue classifications and status change classifications in accordance with one or more embodiments.

FIG. 8 illustrates an example series of acts for managing and tracking debit transaction issues using a pending debit dispute resolution system in accordance with one or more embodiments.

DETAILED DESCRIPTION

Figure 1:
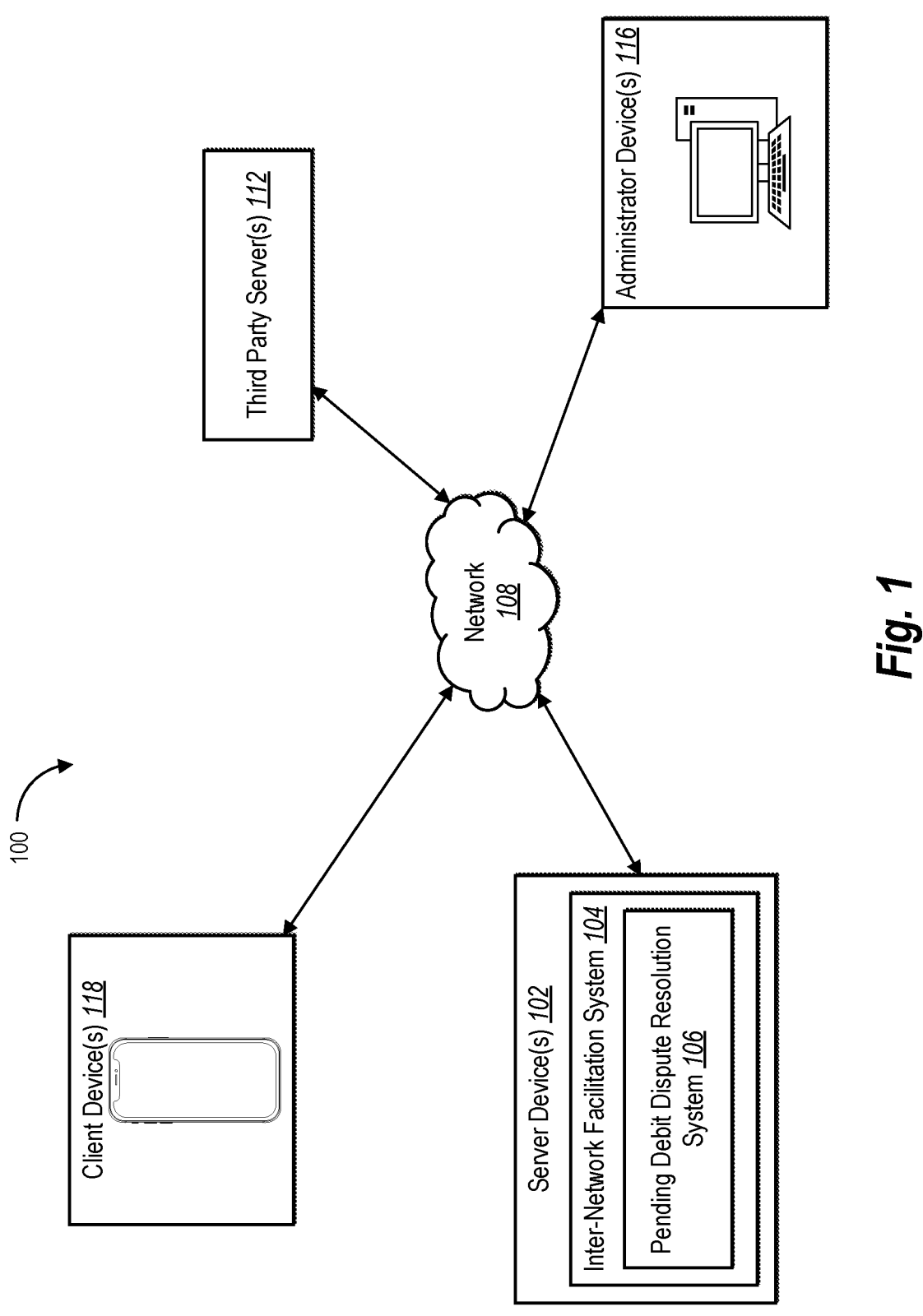
FIG. 1 illustrates a block diagram of an environment for implementing an inter-network facilitation system and a pending debit dispute resolution system in accordance with one or more embodiments.

This disclosure describes a pending debit dispute resolution system that can intelligently select models for resolving debit transaction disputes across computer networks while providing user interfaces and options for client devices to report issues with debit transactions when a debit transaction is in a pending state. To illustrate, the pending debit dispute resolution system can receive and identify debit reported issue communications from client devices while debit transactions are pending. The pending debit dispute resolution system can identify issue classifications (e.g., from the reported issue communications) and also monitor settlement computer networks to identify status change classifications corresponding to the debit transactions. Based on the issue classifications and the status change classifications, the pending debit dispute resolution system can select a debit dispute filing model/approach for resolving the debit reported issue communication.

As mentioned above, in one or more embodiments, the pending debit dispute resolution system selects and utilizes one of multiple dispute filing models to resolve a reported issue with a debit transaction. For example, the pending debit dispute resolution system can determine an issue classification for the pending debit transaction that can be used to select a dispute filing model for resolving the reported issue with a debit transaction. To illustrate, the pending debit dispute resolution system can identify issue classifications with a high dispute confirmation probability and issue classifications with a low dispute confirmation probability. In some implementations, the pending debit dispute resolution system selects a client confirmation dispute filing model for issue classifications with a low dispute confirmation probability and selects a client confirmation dispute filing model for issue classifications with a high dispute confirmation probability.

As mentioned above, the pending debit dispute resolution system also selects a dispute filing model utilizing status change classifications. Indeed, the pending debit dispute resolution system monitors settlement computer networks to identify settlement features corresponding to debit transactions. In some implementations, the pending debit dispute resolution system compares the settlement features with features of the debit transaction corresponding to the reported issue communication to determine status change classifications. Thus, for example, the pending debit dispute resolution system can determine a change in transaction amount, a change in vendor identity, a change in transaction reason, or other feature modifications. For some issue classifications (e.g., issue classifications with low dispute confirmation probability), the pending debit dispute resolution system can select a dispute filing model based on the status change classification. Thus, the pending debit dispute resolution system can intelligently determine a dispute filing model based on both the issue classification and the status change classification.

For example, using a direct dispute filing model, the pending debit dispute resolution system can file a debit transaction dispute with an appropriate third-party dispute system. For instance, after receiving a reported issue communication from a client device, the pending debit dispute resolution system can monitor a pending debit transaction to determine when the debit transaction settles, compare the settlement and the debit transaction, and resolve the debit dispute (e.g., by automatically providing the debit dispute request to a dispute computer network).

Alternatively, the pending debit dispute resolution system can use a client confirmation dispute filing model by transmitting a confirmation request to a client device. To illustrate, the pending debit dispute resolution system can provide a confirmation request to the client device that submitted the reported issue communication that indicates the status change classification. If there is a positive client confirmation of the debit transaction dispute, the pending debit dispute resolution system can transmit a debit dispute communication concerning the reported issue with the debit transaction to a dispute computer network. If there is a negative client confirmation (i.e., no client response or a negative confirmation) of the debit transaction dispute, the pending debit dispute resolution system can clear the issue classification corresponding to the debit transaction.

As suggested above, the disclosed pending debit dispute resolution system provides several improvements or advantages over conventional networking systems. As an initial matter, the pending debit dispute resolution system provides improved flexibility and functionality relative to conventional systems. As mentioned above, conventional systems fail to provide an option for disputing a debit transaction in a pending state due to complexities arising from finalizing the debit transaction across computer networks while satisfying reporting and clearing requirements in a timely fashion. In contrast, the pending debit dispute resolution system allows client devices to initiate dispute procedures for debit transactions in a pending state, and then intelligently selects a dispute filing model to efficiently resolve the dispute while satisfying obligations for reporting and clearing through the intelligently selected dispute filing model.

In addition, as discussed above, some prior systems are rigidly fixed to a one-size-fits-all approach indiscriminately employing a rigid methodology. In contrast, the pending debit dispute resolution system provides a flexible treatment of a reported issue with a debit transaction based on the classification and circumstances of the disputed debit transaction. Additionally, the pending debit dispute resolution system generates a timely response to a debit transaction dispute request by providing a method to report an issue with a debit transaction regardless of a pending status of the debit transaction. The pending debit dispute resolution system enables a flexible treatment of any type of reported issue with a debit transaction. The pending debit dispute resolution system also reduces dispute fraud regarding disputes by users who change their mind by flexibly and intelligently seeking additional verification before filing uncertain debit disputes with internal or third-party dispute resolution systems.

In addition, the pending debit dispute resolution system can improve computational efficiency over prior systems. As opposed to prior systems that require excessive computational and bandwidth resources to account for multiple client device interactions to initiate a dispute for each disputed debit transaction, the pending debit dispute resolution system can reduce the computational and bandwidth requirements by reducing the required client device interactions. Indeed, the debit resolution system reduces inefficiencies resulting from multiple debit transaction dispute interactions by acting on an initial request to report an issue with a pending debit transaction and incorporating an automatic monitoring system to determine the debit transaction status and selecting a filing model that bypasses further action from the requesting device unless there is a high probability of resolving the dispute through a confirmation request. Accordingly, the pending debit dispute resolution system requires minimal administrator or client device interaction to resolve pending debit transaction disputes. Indeed, in some implementations, the debit dispute system preserves computing resources (such as processing power and memory) by facilitating self-service debit dispute requests through efficient user interfaces for disputing pending debit transactions (e.g., without requiring interactions between client devices and administrator devices).

As indicated by the foregoing discussion, the present disclosure utilizes a variety of terms to describe features and advantages of the pending debit dispute resolution system. For example, as used herein, the term "inter-network facilitation system" refers to a system that, via the pending debit dispute resolution system, facilitates digital communications across different computing systems over one or more networks. For example, an inter-network facilitation system manages digital accounts, such as credit accounts, bank accounts, transaction card accounts, and secured accounts in addition to financial information, such as funds transfers, withdrawals, deposits, and loans for one or more user profiles registered within the inter-network facilitation system. In some cases, the inter-network facilitation system is a centralized network system that includes multiple network components for facilitating access to online digital accounts via a central network location. Indeed, the inter-network facilitation system can link accounts from different network-based financial institutions to provide information regarding, and management tools for, the different accounts.

As used herein, the term "debit transaction" refers to a transaction that debits funds from an account (e.g., removes the payment for a purchase directly from a purchaser's account). For example, a point-of-sale purchase that is processed using a bank card linked to a checking account. Unlike a credit transaction, a debit transaction often requires that the purchaser have assets available at the time of purchase in the account to cover the transaction. Relatedly, the term "pending debit transaction" refers to a debit transaction that is in the process of being deducted from a purchaser's account. For example, a merchant may request an authorization for a debit transaction, but the merchant may not process the same transaction immediately. To illustrate, a purchaser may order 4 items with a cost of $30 each and the merchant may request an authorization for $120. This would appear as a pending transaction. Often, a debit transaction is settled within 1 to 3 days but can also take more than a week to settle.

As used herein, the term "settlement" refers to the process of moving funds from the purchaser's account to the merchant's account following a debit purchase. For example, settlement occurs when the issuing bank transfers the funds from the cardholder's account to the payment processor, who then transfers the money to the acquiring bank. In other words, a settlement occurs when the debit transaction is complete/funds.

As used herein, the term "debit transaction dispute" refers to a query, dispute, question, or disagreement regarding the validity of a debit transaction. Relatedly, the term "dispute request" or "debit dispute request" refers to a request via a client device of a purchaser to begin a debit transaction dispute. For example, a dispute request occurs when a client device contacts an agent device disputes the validity of a debit transaction.

As used herein, the term "feature" refers to a characteristic, attribute, or aspect of a debit transaction or settlement. For example, a feature can include a characteristic that can be compared between a pending debit transaction and settled debit transaction to determine a status change classification. To illustrate, a feature of the merchant name associated with a pending debit transaction can be compared with the feature of the merchant name associated with the settled debit transaction to determine if there was a change that merits a positive status change classification. To further illustrate, a feature can include a transaction purpose identifier (e.g., identifying the purpose of the transaction) associated with a pending debit transaction. The pending debit dispute resolution system can compare an initial transaction purpose identifier with an additional transaction purpose identifier associated with the settled debit transaction to determine a status change classification.

As used herein, the term "issue classification" refers to a class or category of a dispute. For example, an issue classification can include a type or reason for the debit dispute request. To illustrate, a debit dispute request may be submitted with an issue classification comprising a claim that a debit transaction was cancelled.

As used herein, the term "status change classification" refers to a class, category, or status of change for a debit transaction (e.g., a change between the debit transaction at the time of the reported issue communication and settlement). For example, a status change classification can include a binary classification that indicates an alteration in the features of the debit transaction between the pending state and the settled state (e.g., positive or negative). In some embodiments, a status change classification is a multi-class classification indicating the presence and type of a changed feature (e.g., positive name change or negative name change). To illustrate, a pending debit transaction can be for an amount of $312 and thereafter change to a settled debit transaction amount of $302 which results in a positive status change classification with regard to value.

Additional detail regarding the pending debit dispute resolution system will now be provided with reference to the figures. In particular, FIG. 1 illustrates a block diagram of a system environment (or "environment") 100 for implementing an inter-network facilitation system 104 and a pending debit dispute resolution system 106 in accordance with one or more embodiments. As shown in FIG. 1, the environment 100 includes server device(s) 102, third-party server(s) 112, administrator device(s) 116, and client device(s) 118 connected via a network 108. While FIG. 1 shows an embodiment of the pending debit dispute resolution system 106, alternative embodiments and configurations are possible. Furthermore, although FIG. 1 illustrates the pending debit dispute resolution system 106 being implemented by a particular component and/or device within the environment 100, the pending debit dispute resolution system 106 can be implemented, in whole or in part, by other computing devices and/or components in the environment 100 (e.g., the administrator device(s) 116 and/or the client device(s) 118). Additional description regarding the illustrated computing devices is provided with respect to FIGS. 9-10 below.

As shown in FIG. 1, the server device(s) 102 can include the inter-network facilitation system 104. In some embodiments, the inter-network facilitation system 104 determines, stores, generates, and/or displays financial information corresponding to a digital account (e.g., a banking application, a money transfer application). Furthermore, the inter-network facilitation system 104 can electronically communicate (or facilitate) financial transactions between one or more digital accounts (and/or computing devices). In some embodiments, the inter-network facilitation system 104 also tracks and/or monitors financial transactions and/or financial transaction behaviors of a user within a user profile.

Indeed, in some examples, the inter-network facilitation system 104 facilitates financial transactions and digital communications across different computing systems and/or network components over one or more transaction computer networks. Indeed, in some cases, the environment 100 also includes transaction computer network devices (or "transaction computer networks"). The transaction computer network devices can include a variety of computer devices for implementing, facilitating, processing, or executing a transaction. Thus, for instance, the transaction computer network devices can include a card transaction computer network for implementing a variety of transactions using cards (e.g., credit cards, debit cards, etc.). Similarly, the transaction computer network devices can include an ACH transaction computer network (e.g., computing devices for implementing ACH transactions), and the transaction computer network devices can include a transfer transaction computer network (e.g., computing devices for implementing transfer transactions between accounts).

For example, the inter-network facilitation system 104 manages digital accounts, such as debit accounts, credit accounts, secured accounts, and other accounts for a single account registered within the inter-network facilitation system 104. In some cases, the inter-network facilitation system 104 is a centralized network system that facilitates access to online banking accounts, debit accounts, credit accounts, and other accounts within a central network location. Indeed, the inter-network facilitation system 104 can link accounts from different network-based financial institutions (e.g., transaction computer network devices) to provide information regarding, and management tools for, the different accounts. Furthermore, the pending debit dispute resolution system 106 can provide various user interfaces and information for display (e.g., via the administrator device(s) 116 and/or the client device(s) 118).

As also illustrated in FIG. 1, the environment 100 includes the administrator device(s) 116 and the client device(s) 118. For example, the administrator device(s) 116 and the client device(s) 118 may include, but are not limited to, a mobile device (e.g., smartphone, tablet) or other type of computing device, including those explained below with reference to FIGS. 9-10. For example, the administrator device(s) 116 can include computing devices that display user interfaces for administrating or managing settings, configurations, pipelines, or data for the inter-network facilitation system 104. Moreover, the client device(s) 118 can include computing devices associated with (and/or operated by) users and corresponding user profiles for the inter-network facilitation system 104. In some embodiments, the client device(s) 118 include computing devices that display user interfaces for managing digital accounts and/or debit transaction disputes (e.g., submitting dispute requests, monitoring debit transactions, etc.) and/or portraying information regarding digital accounts (e.g., debit account transactions, debit account balances, etc.). Moreover, although FIG. 1 illustrates a single instance of the administrator device(s) 116 and the client device(s) 118, the environment 100 can include various numbers of administrator or client devices that communicate and/or interact with the inter-network facilitation system 104 and/or the pending debit dispute resolution system 106.

In one or more embodiments, the client device(s) 118 include a client application. The client application can include instructions that (upon execution) cause the client device(s) 118 to perform various actions. For example, a user associated with an account can interact with the client application on the client device(s) 118 to access financial information, initiate a debit transaction, dispute a debit transaction, manage a debit transaction, or modify account settings. In some embodiments, the administrator device(s) 116 also includes an administrator application similar to the client application. The client application may be a web application or a native application (e.g., a mobile application, a desktop application, etc.). In one or more implementations, the client application interfaces with the inter-network facilitation system 104 to provide digital content including graphical user interfaces to the client device(s) 118. In one or more implementations, the client application comprises a browser that renders graphical user interfaces on the display of the client device(s) 118.

In certain instances, the client device(s) 118 corresponds to one or more user accounts (e.g., user accounts stored at the server device(s) 102). For instance, a user of a client device can establish a user profile with login credentials and various information corresponding to the user. In addition, the digital accounts and/or user profiles can include information regarding financial information and/or financial transaction information for users (e.g., name, telephone number, address, bank account number, credit amount, debt amount, financial asset amount), payment information, transaction history information, and/or contacts for financial transactions. In some embodiments, a digital account and/or a user profile can be accessed via multiple devices (e.g., multiple client devices) when authorized and authenticated.

The present disclosure utilizes client devices to refer to devices associated with such user profiles. In referring to a client device, the disclosure and the claims are not limited to communications with a specific device, but any device corresponding to a user profile of a particular user. Accordingly, in using the term computing device, this disclosure can refer to any computing device corresponding to a user profile of an inter-network facilitation system.

As shown, the environment 100 also includes third-party server(s) 112. For example, in one or more embodiments, the inter-network facilitation system 104 utilizes the third-party server(s) 112 to assist in processing transactions (e.g., managing a system of record, transferring funds between accounts, monitoring debit transactions, settling debit transactions, etc.). In some cases, the third-party server(s) 112 house and operate third party systems, such as machine learning servers, event databases, and/or other network components that consume or utilize debit transaction data. The third-party server(s) 112 can include integrated or external (e.g., third party) servers for storing, analyzing, and managing data volumes. For example, the third-party server(s) 112 can include a variety of cloud/web-based systems for storing, processing, analyzing, and delivering debit transaction data, event data, and/or account data. The third-party server(s) 112 can include a variety of server devices, as described in relation to FIGS. 9-10.

As further shown in FIG. 1, the environment 100 includes the network 108. As mentioned above, the network 108 can enable communication between components of the environment 100. In one or more embodiments, the network 108 may include a suitable network and may communicate using a various number of communication platforms and technologies suitable for transmitting data and/or communication signals, examples of which are described with reference to FIGS. 9-10. Furthermore, although FIG. 1 illustrates the server device(s) 102, the third-party server(s) 112, and the administrator device(s) 116 communicating via the network 108, the various components of the environment 100 can communicate and/or interact via other methods (e.g., the server device(s) 102 and the administrator device(s) 116 can communicate directly).

Figure 2:
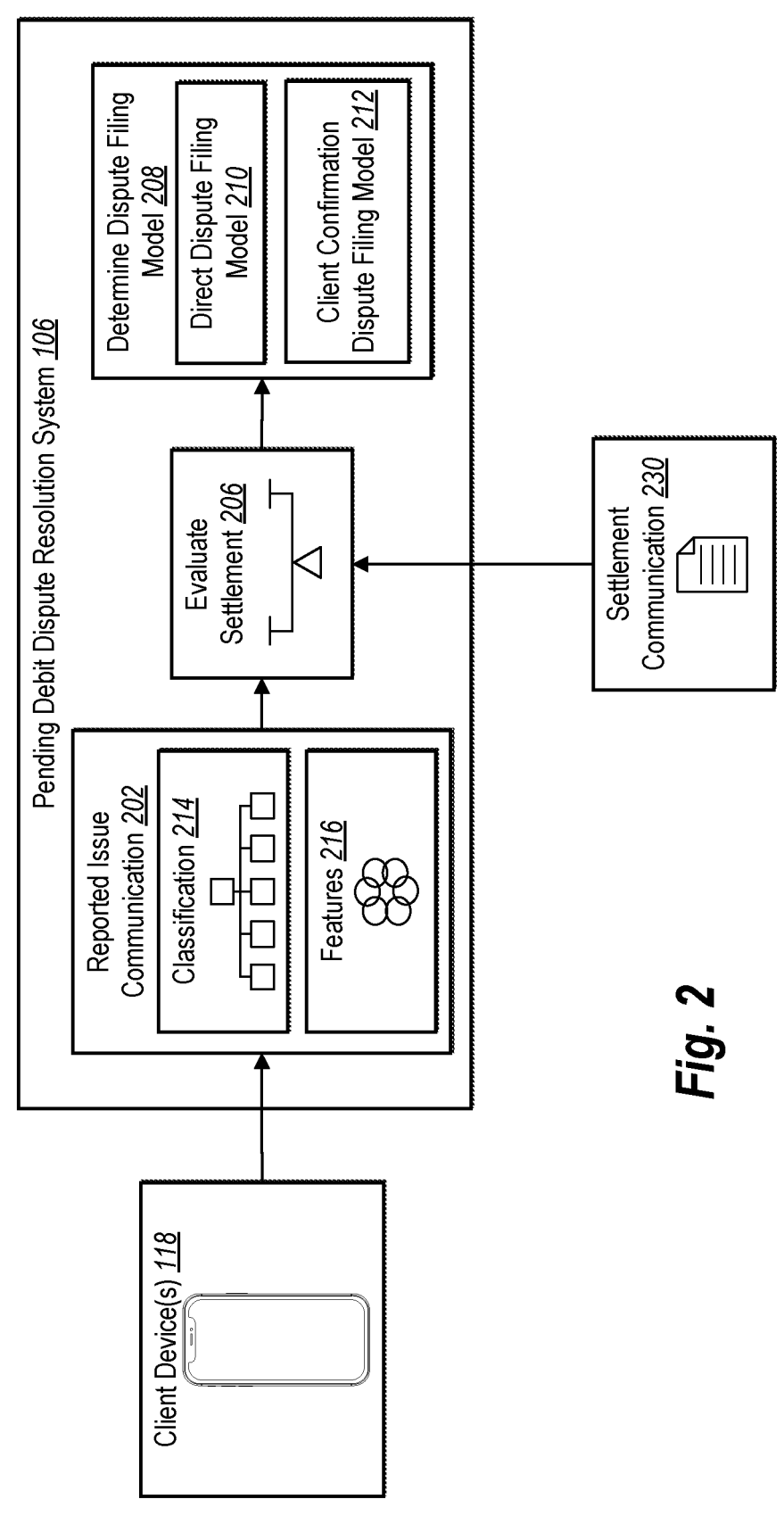
FIG. 2 illustrates an example overview of managing and resolving debit transaction disputes using a pending debit dispute resolution system in accordance with one or more embodiments.

As mentioned, in certain embodiments, the pending debit dispute resolution system 106 can manage and resolve disputed pending debit transactions. FIG. 2 illustrates an example overview of managing and resolving disputed debit transactions in accordance with one or more embodiments. Additional detail regarding the various acts of FIG. 2 is provided hereafter with reference to subsequent figures.

As illustrated in FIG. 2, the client device 118 can interact with the pending debit dispute resolution system 106 to report an issue with a pending debit transaction. For example, after initiating a debit transaction (but before the debit transaction has been completed/finalized) a user associated with a user account can interact with a client application on the client device 118 to provide a reported issue communication 202.

The pending debit dispute resolution system 106 can receive a reported issue communication 202 in multiple ways. For example, pending debit dispute resolution system 106 can receive the reported issue communication 202 in the form of a text thread from the client device, a selection of an option (e.g., drop down item, menu item) on the client device, a system generated notification, a response to an API call, or an agent provided selection. Indeed, the pending debit dispute resolution system 106 can apply natural language processing ("NLP") model to the reported issue communication 202 to identify keywords or keyphrases related to the pending debit dispute. To illustrate, the pending debit dispute resolution system 106 may apply an NLP model to a reported issue communication 202 to identify a keyphrase such as "unauthorized transaction," "not as described," or "merchandise was returned." The pending debit dispute resolution system 106 may further associate the keyphrase from the reported issue communication 202 with a classification 214 (i.e., an issue classification) and/or features 216.

As another example, the pending debit dispute resolution system 106 can use a machine learning model that is trained to analyze the reported issue communication 202 and determine an appropriate classification 214 and/or features 216. For example, the pending debit dispute resolution system 106 can train a machine learning model (e.g., a recurrent neural network) to automatically extract an intent from the reported issue communication 202 text thread of "I would like to file a dispute for my cancelled purchase using my debit card last Thursday" to determine the existence of an issue with a pending debit transaction. The machine learning model can sample the reported issue communication 202 in accordance with a training policy and analyze individual content items to determine the existence, classification 214, and features 216 of a pending debit dispute.

To illustrate, the pending debit dispute resolution system 106 can train a neural network—such as a convolutional neural network or a recurrent neural network including a long short term memory ("LSTM") network—utilizing a training dataset comprising digital communications and ground truth classifications and/or features. The pending debit dispute resolution system 106 can utilize the recurrent neural network to generate a predicted classification and/or predicted feature. The pending debit dispute resolution system 106 can utilize a loss function to compare the predicted classification/feature with the ground truth classification/feature and modify parameters of the neural network. For example, the pending debit dispute resolution system 106 can utilize gradient descent and back propagation to modify parameters of the neural network to learn to identify issue classifications and/or features included within a digital communication.

Thus, as shown, the pending debit dispute resolution system 106 analyzes the reported issue communication 202 to determine a classification 214 and features 216. In particular, the pending debit dispute resolution system 106 identifies, from the reported issue communication 202, a classification 214 that specifies a reason for the reported issue with the pending debit transaction (e.g., unauthorized transaction, non-receipt of goods/services, cancelled transaction, credit not posted, duplicate charge, incorrect amount charged, goods/services not as described, paid for goods/services by other means, merchandise was returned, ATM cash not received) and features associated with the debit transaction (e.g., merchant name, transaction amount, geographic location, time/date of transaction, goods/services purchased).

As illustrated in FIG. 2, the pending debit dispute resolution system 106 also receives a settlement communication 230. The settlement communication 230 can include information associated with the settlement of the pending debit transaction, including features of the settled debit transaction (e.g., merchant name, amount, geographic location, time/date of transaction, time/date of settlement, goods/services).

As further illustrated in FIG. 2, the pending debit dispute resolution system 106 can perform an act 206 of evaluating the settlement. For example, the pending debit dispute resolution system 106 can perform the act 206 by comparing the features 216 with features identified from the settlement communication 230. By comparing the features 216 with features from the settlement communication 230, the pending debit dispute resolution system 106 determines any changes to the debit transaction between the time of the report of the issue with the debit transaction and the time of the settlement.

Indeed, the act 206 of evaluating the settlement can include determining the relevance of any changes to the debit transaction between the time of the report of the issue with the debit transaction and the time of the debit transaction settlement to the resolution of the issue. The pending debit dispute resolution system 106 can compare the settlement features with features of the debit transaction corresponding to the reported issue communication to determine status change classifications. Thus, for example, the pending debit dispute resolution system 106 can determine a change in transaction amount, a change in vendor identity, or other feature modifications.

To explain further, the act 206 of evaluating the settlement can include dynamically monitoring settlement computer networks and receiving a settlement communication 230 to determine the settlement status of a debit transaction and identify when the settlement is complete. Alternatively, the pending debit dispute resolution system 106 can perform the act 206 of evaluating the settlement through otherwise receiving and evaluating a settlement communication 230 from a settlement system (e.g., a third-party server) indicating that the debit transaction has settled. Indeed, the act 206 of evaluating the settlement can include determining that the debit transaction is complete, including the process of moving funds from the purchaser's account to the merchant's account following a debit purchase, has been accomplished.

As mentioned, the pending debit dispute resolution system 106 can intelligently determine a dispute filing model based on both the issue classification and the status change classification. As shown in FIG. 2, the pending debit dispute resolution system 106 can perform act 208 to determine a dispute filing model to assign the appropriate dispute filing model to the debit dispute request and determine if the debit dispute request should be handled with a direct dispute filing model 210 or a client confirmation dispute filing model 212. To elaborate, the pending debit dispute resolution system 106 can utilize the classification 214 and features 216 from the reported issue communication 202 as well as perform the act 206 of evaluating the settlement to determine an appropriate dispute filing model. In particular, the pending debit dispute resolution system 106 can categorize the dispute based on the issue classification (e.g., the reason for the dispute and/or a dispute confirmation probability) and the status change categorization (e.g., a categorization determined by comparing the settlement features with features of the debit transaction corresponding to the reported issue communication).

Indeed, in one or more implementations, the pending debit dispute resolution system 106 applies a two-stage logic filter to select a dispute filing model. For example, the pending debit dispute resolution system 106 can select a dispute filing model for a certain combination of issue classifications and status change classifications. For a first dispute resolution and a first status change classification, the pending debit dispute resolution system 106 can select a first dispute filing model. For the first dispute resolution and a second status change classification, the pending debit dispute resolution system 106 can select a second dispute filing model. Moreover, for a second dispute resolution, the pending debit dispute resolution system 106 can select the first dispute filing model. Thus, the pending debit dispute resolution system 106 determines a dispute filing model based on both the issue classification and a status change classification. To illustrate, for some issue classifications with low dispute confirmation probability (as reflected in the issue classification) and a positive status change classification, the pending debit dispute resolution system 106 can select a client confirmation dispute filing model.

The pending debit dispute resolution system 106 can determine the dispute confirmation probability in multiple ways. For example, the pending debit dispute resolution system 106 can determine the dispute confirmation probability by analyzing historical data of past debit disputes (e.g., type of disputes, patterns of user behavior, related merchant disputes, amount in dispute) to determine issue classifications that have a low dispute confirmation probability. To illustrate, the pending debit dispute resolution system 106 can identify a dispute confirmation rate for different issue classifications. The pending debit dispute resolution system 106 can compare the dispute confirmation rates for the issue classifications with a confirmation threshold (e.g., 50% or 75%). For issue classifications that fail to satisfy the dispute confirmation threshold, the pending debit dispute resolution system 106 can select a particular dispute mode (e.g., the client confirmation dispute filing model).

In some implementations, the pending debit dispute resolution system 106 can determine dispute confirmation probability by analyzing user credit scores to determine credit score values that indicate a low dispute confirmation probability. As another example, the pending debit dispute resolution system 106 can determine dispute confirmation probability by analyzing the frequency of the type of debit dispute (e.g., frequency of disputes filled by the purchaser, frequency of disputes against the merchant, frequency of the issue classification). As another example, the pending debit dispute resolution system 106 can determine dispute confirmation probability by determining a client device supplied urgency value associated with the pending debit dispute.

The pending debit dispute resolution system 106 can also determine dispute confirmation probability by training and implementing a machine learning model. For example, the pending debit dispute resolution system 106 can provide input features (e.g., an issue classification, contextual features, client features, or other characteristics described herein) to a trained machine learning model, such as a neural network. The neural network can determine a dispute confirmation probability for an issue classification (or reported issue communication). The pending debit dispute resolution system 106 can then select a particular dispute mode for the issue classification based on the dispute confirmation probability.

Additionally, the pending debit dispute resolution system 106 can categorize the reports of issues with the debit transactions into categories designed to decrease inaccurate debit transaction disputes (and/or minimize purchaser fraud) by seeking confirmation from purchasers in situations more likely to include purchasers changing their mind after filing uncertain debit transaction issue reports.

As mentioned above, the pending debit dispute resolution system 106 can determine a confirmation threshold by establishing a minimum acceptable value, or minimum acceptable likelihood that an issue report will move forward (e.g., be confirmed or finalized by a client). For example, the pending debit dispute resolution system 106 can determine a value corresponding to an 80% confirmation threshold that a particular pending issue report will result in an actual debit dispute after the debit transaction settles. Based on the pending issue report satisfying or not satisfying the determined threshold priority requirement, the pending debit dispute resolution system 106 can select a particular dispute filing model. For example, the pending debit dispute resolution system 106 can select a direct dispute filing model 210 if the pending issue report satisfies the 80% threshold priority requirement. In contrast, based on the pending issue report not satisfying the 80% threshold priority requirement, the pending debit dispute resolution system 106 can select the client confirmation dispute filing model 212. Additional detail regarding particular dispute filing models is provided below with reference to subsequent figures.

As mentioned previously, the pending debit dispute resolution system 106 can select the direct dispute filing model 210 for reported issues with debit transactions that have a high dispute confirmation probability or satisfy the threshold priority requirement. For example, FIG. 3 illustrates implementing a direct dispute filing model in accordance with one or more embodiments.

Figure 3:
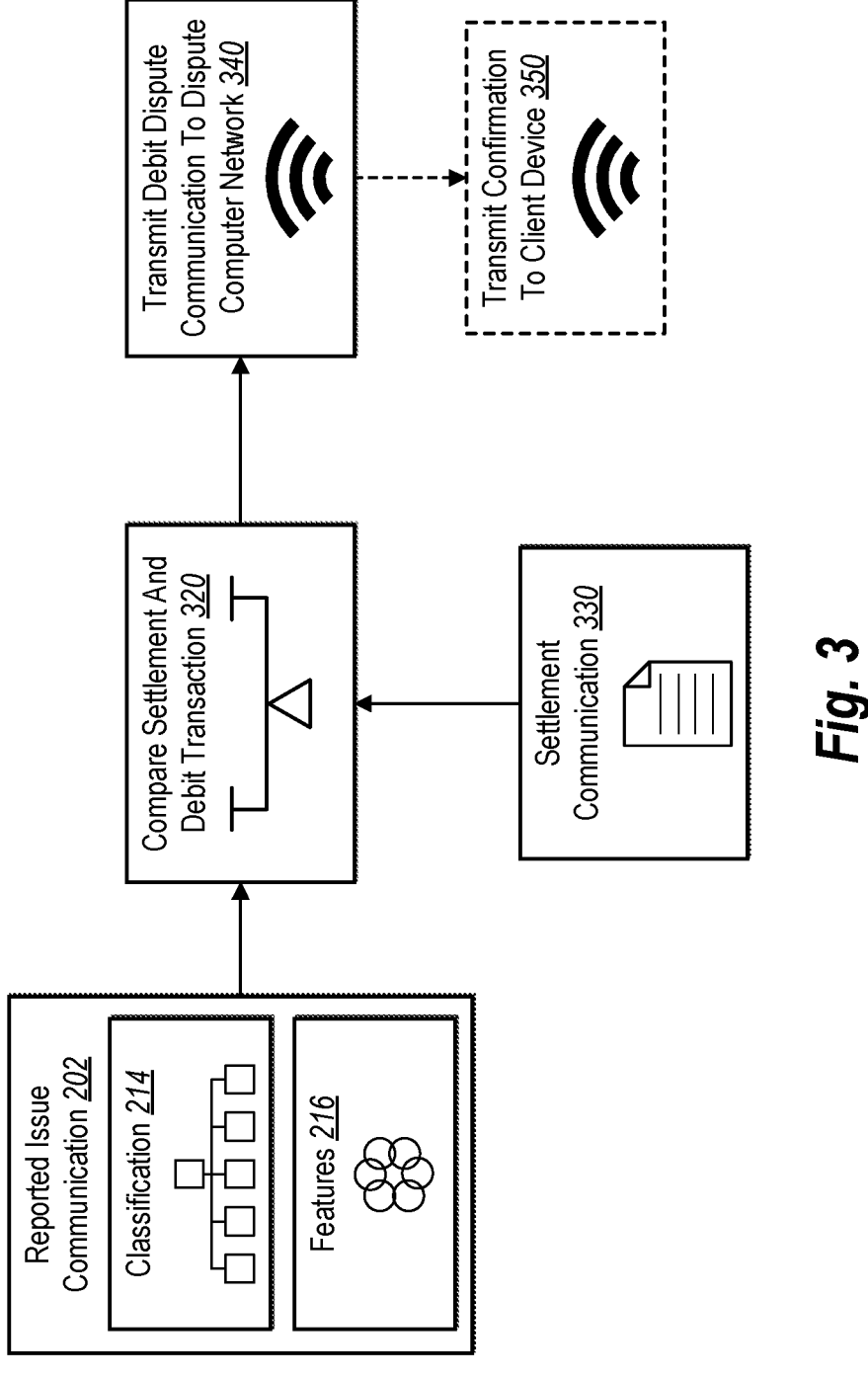
FIG. 3 illustrates a direct dispute filing model in accordance with one or more embodiments.

As shown in FIG. 3, in certain embodiments of the direct dispute filing model 210, the pending debit dispute resolution system 106 receives a reported issue communication 202 wherein the communication comprises the classification 214 and the features 216. As mentioned, the classification 214 can include information related to the classification of the reported issue with debit transaction. Indeed, the classification 214 provides information the pending debit dispute resolution system 106 can utilize to classify incoming reported issues with debit transactions. The features 216 can include information related to identifying the pending debit transaction. Indeed, the features 216 can include features that identify the pending debit transaction and facilitate determining changes to the transaction between the time the issue with the debit transaction is reported and the time the transaction settlement is complete. The direct dispute filing model 210 can acknowledge the receipt of the reported issue communication 202 to the client device.

As further illustrated in FIG. 3, the direct dispute filing model 210 can receive the settlement communication 230 and perform the act 320 to compare the settlement with the debit transaction. More particularly, the direct dispute filing model 210 can compare features of the settlement and the debit transaction to determine changes in the debit transaction from the time of the initial report of an issue with the debit transaction until the time of the debit transaction settlement. For example, the direct dispute filing model 210 can determine changes such as a change in the amount charged, the merchant name, the time/date charged, or the geographic location. The direct dispute filing model 210 can also determine if other information associated with the debit transaction has changed such as determining if there are additional related debit charges or additional related issues with the debit transaction. To illustrate, the direct dispute filing model 210 can perform the act 320 to compare the settlement with the debit transaction and evaluate an input that includes: a classification 214 associated with an incorrect amount charged, and features 216 associated with a first amount charged, and a settlement communication 330 associated with no change in amount (see also FIG. 5 and related discussion).

The direct dispute filing model 210 can perform the act 320 to compare the debit transaction settlement and the debit transaction using the classification 214, features 216, and settlement communication 230 to determine a status change classification value. A status change classification value can include a binary classification that indicates an alteration in the features of the debit transaction between the pending state and the settled state (e.g., positive or negative). In some embodiments, a status change classification is a multi-class classification indicating the presence and type of a changed feature (e.g., positive name change or negative name change). For example, the direct dispute filing model 210 can perform the act 320 to compare the debit transaction settlement and the debit transaction to determine a negative status change classification value due to identifying no relevant changes associated with the debit transaction. To illustrate, the direct dispute filing model 210 can evaluate an input that includes a classification 214 associated with an incorrect amount of $32 charged, features 216 associated with an initial $32 amount charged, and a settlement communication 230 associated with no change in the $32 amount to assign a negative status change classification value. The direct dispute filing model 210 is not limited to evaluating the amount charged and can compare multiple features of the debit transaction as described below in relation to subsequent figures.

As further shown on FIG. 3, the direct dispute filing model 210 can then transmit a dispute communication that indicates a debit transaction dispute to a dispute computer network 340 (e.g., without further interaction from the purchaser who submitted the debit dispute request). The dispute computer network can include internal systems and/or third-party dispute communication systems. For example, the pending debit dispute resolution system 106 can provide a dispute communication by transmitting signals to modify internal databases at the server device(s) 102 (e.g., to indicate that the transaction is disputed). Similarly, the pending debit dispute resolution system 106 can provide a dispute communication by transmitting signals to an external server, such as the third party server(s) 112. The direct dispute filing model 210 can optionally transmit confirmation to client device 350 to provide a status update comprising information about the submitted debit dispute.

As mentioned above, in some embodiments, the pending debit dispute resolution system 106 uses a client confirmation dispute filing model 212 for reports of issues with debit transactions that have a lower dispute confirmation probability. Indeed, the pending debit dispute resolution system 106 can select the client confirmation dispute filing model 212 for reports of issues with debit transactions based on an issue classification and a status change classification as illustrated in FIG. 4 and described below.

To illustrate, the pending debit dispute resolution system 106 can select the client confirmation dispute filing model 212 for reports of issues with debit transactions based on a two-stage logic filter that includes an issue classification and a status change classification. For example, in one or more embodiments the pending debit dispute resolution system 106 determines that a classification 214 associated with an incorrect amount charged satisfies a threshold priority requirement and has a high dispute confirmation probability. In that case, upon determining that the status change classification is negative, the dispute filing model 208 selects the direct dispute filing model 210 to resolve the reported issue. Additionally, the dispute filing model 208 can select the client confirmation dispute filing model 212 to resolve the reported issue based on the issue classification and irrespective of the status change classification value. For example, in the case of non-receipt of goods, the pending dispute resolution system 106 could always use a client confirmation dispute filing model thereby allowing for an additional confirmation that the goods/services were not subsequently received by the purchaser.

Figure 4:
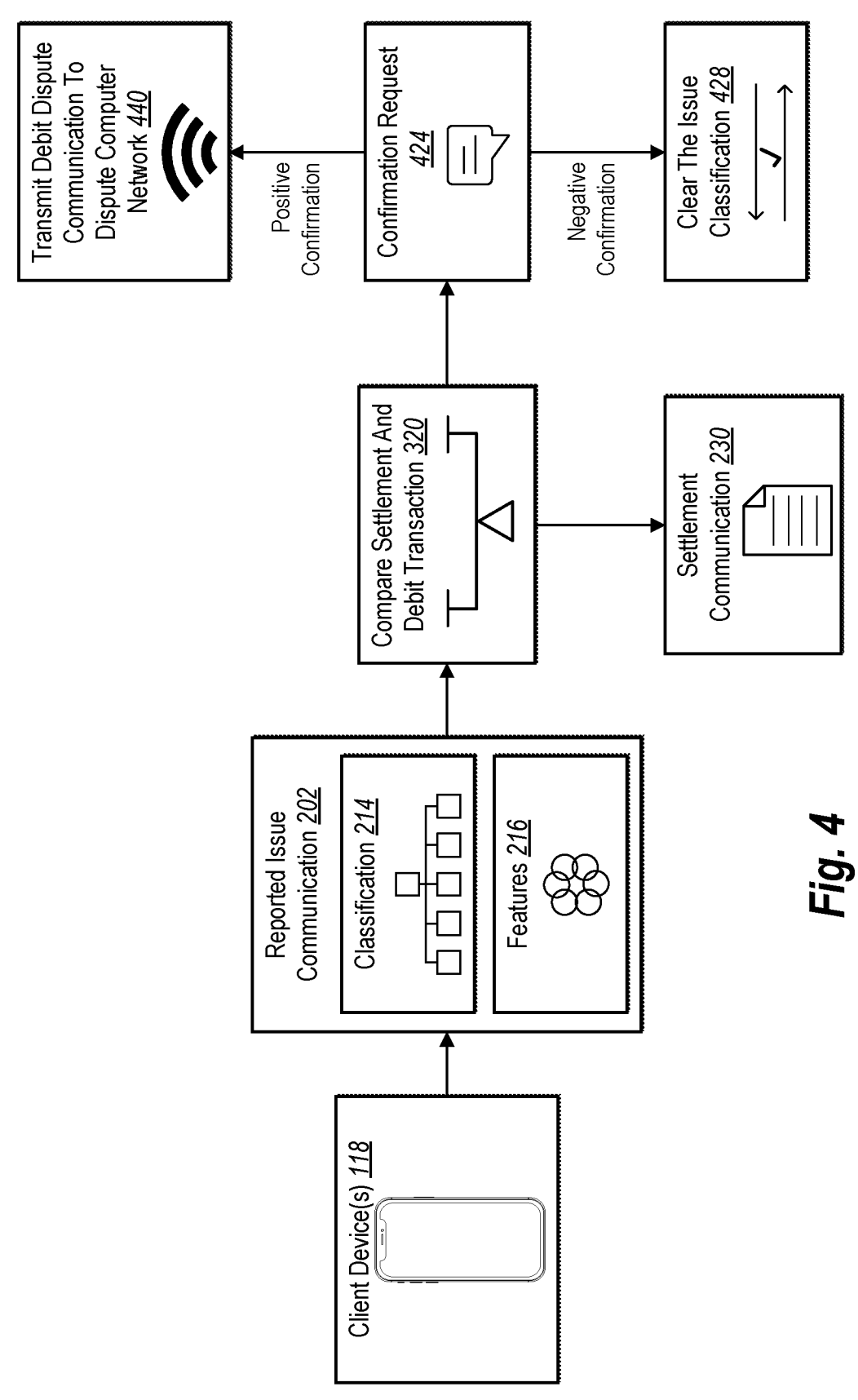
FIG. 4 illustrates a client confirmation dispute filing model in accordance with one or more embodiments.

In particular, as shown in FIG. 4, in certain embodiments of the client confirmation dispute filing model 212, the pending debit dispute resolution system 106 performs the acts 202, 230, and 320. The pending debit dispute resolution system 106 can perform these acts as discussed above in relation to FIG. 3.

As further shown in FIG. 4, the client confirmation dispute filing model 212 can transmit a confirmation request 424. For example, the pending debit dispute resolution system 106 sends the confirmation request to the client device requesting a confirmation before transmitting the debit transaction dispute to the dispute computer network. In some embodiments, the pending debit dispute resolution system 106 can send the confirmation request to an internal computer system. The confirmation request 424 can include information comparing the original pending debit transaction and the settlement, including the status change classification value (e.g., positive, negative, type). The pending debit dispute resolution system 106 receives a confirmation response from the client device in response to the confirmation request 424. Indeed, in response to a positive client confirmation of the debit transaction dispute, the pending debit dispute resolution system performs the act 440 to transmit the debit dispute request to a dispute computer network. In contrast, in response to a negative client confirmation (i.e., no client response or a negative confirmation) of the debit transaction dispute, the pending debit dispute resolution system performs the act 428 to resolve the debit dispute request.

To illustrate, the client device may provide a positive confirmation response to the pending debit dispute resolution system 106 indicating a request to file a debit transaction dispute. In response, the pending debit dispute resolution system 106 performs an act 440 and transmits a debit dispute communication to a dispute computer network thereby initiating a debit transaction dispute procedure with the appropriate dispute computer network. The dispute computer network can be a dispute server (e.g., the server(s) 102) and/or a third-party dispute computer system (e.g., the third party server(s) 112). In some embodiments, the act 440 can transmit the debit dispute communication to an agent. In contrast, the client device may provide a negative confirmation response (or not respond at all) to the pending debit dispute resolution system 106 indicating an intent to resolve the report of an issue with the debit transaction without initiating a debit transaction dispute procedure with a dispute computer network. In response, the pending debit dispute resolution system 106 performs the act 428 to resolve the report of an issue with the debit transaction by clearing the issue classification corresponding to the debit transaction without initiating a debit transaction dispute. Indeed, the pending debit dispute resolution system 106 can record the report of an issue with the debit transaction as resolved within the pending debit dispute resolution system 106 (e.g., remove or delete the dispute or modify a report status).

As mentioned above, the pending debit dispute resolution system 106 can determine an appropriate dispute filing model for the debit dispute request based on an issue classification and dispute features. As illustrated in FIG. 5, the pending debit dispute resolution system 106 determines a classification 514 (i.e., an issue classification). As an example illustration of an embodiment, the debit reported issue communication can specify one or more of the classifications 514 including, but not limited to those listed, a dispute for: an unauthorized transaction, non-receipt of goods or services, a cancelled transaction, credit not posted, an incorrect amount charged, goods/services were not as described, goods/services paid for by another means, merchandise that was returned, or ATM cash that was not received.

The pending debit dispute resolution system 106 can associate classifications 514 with the appropriate dispute filing model for categorizing the issue with the debit transaction. For example, as outlined in FIG. 5, the pending debit dispute resolution system 106 can determine a classification 514 associated with a non-receipt of goods or services will always use a client confirmation dispute filing model (as outlined above with regard to FIG. 4). In contrast, as shown in FIG. 5, the pending debit dispute resolution system 106 can use a direct dispute filing model for categorizing the issue with the debit transaction in certain cases. For example, the pending debit dispute resolution system 106 can use a direct dispute filing model (as outlined above with regard to FIG. 3) for categorizing the issue with the debit transaction associated with an unauthorized transaction if there is no change in the merchant name. Similarly, the pending debit dispute resolution system 106 can associate issue classifications 514 and status change classifications with the direct dispute filing model 210 or the client confirmation dispute filing model 212 as illustrated on FIG. 5.

Figure 6:
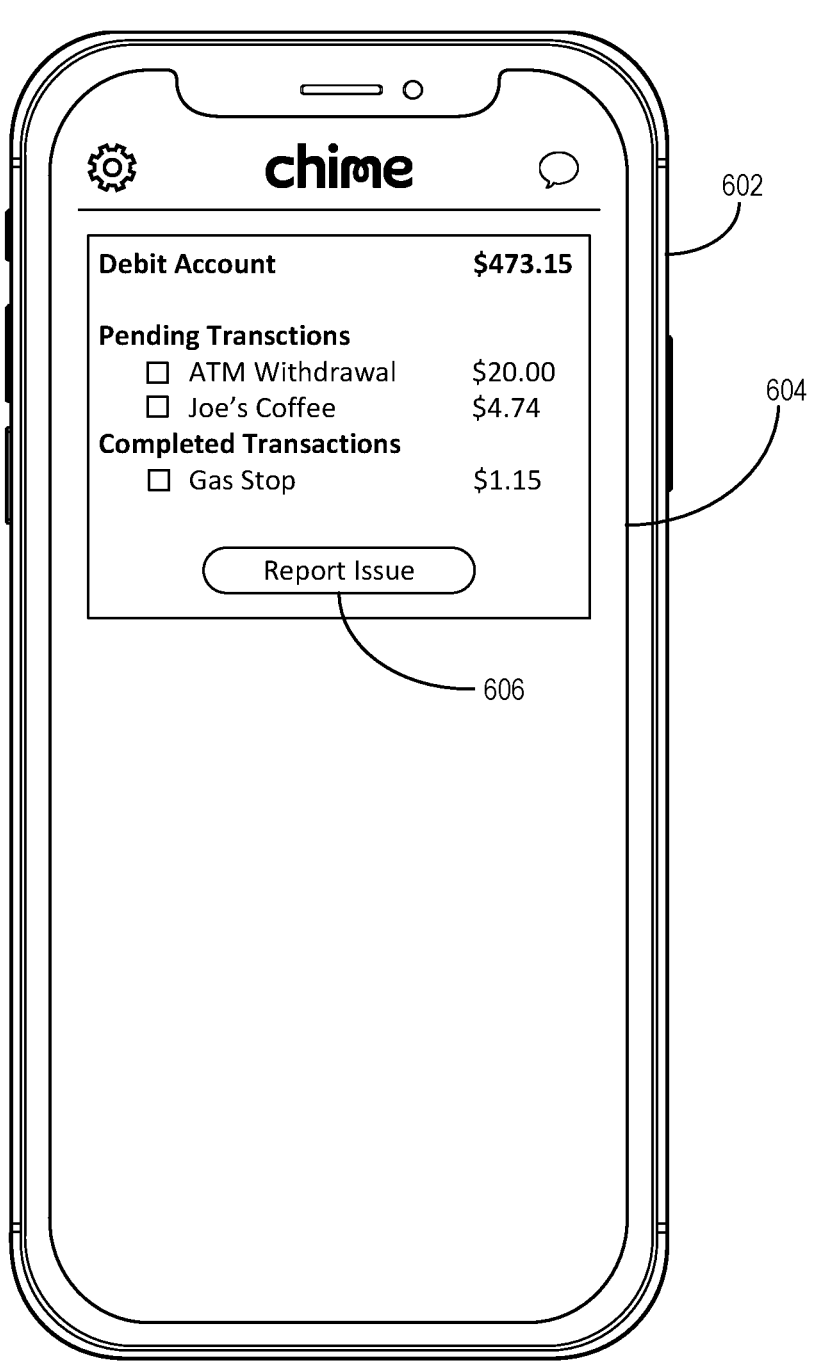
FIG. 6 illustrates an example client device request interface for filing a report for an issue with a pending debit transaction in accordance with one or more embodiments.

As mentioned above, in certain described embodiments, the pending debit dispute resolution system 106 receives and resolves issues with debit transactions from a client device (e.g., the client device 118). FIG. 6 illustrates an example request interface 604 in accordance with one or more embodiments. As illustrated in FIG. 6, the computing device 602 is a client device for submitting a report of an issue with the debit transaction and initiating a dispute filing model within the inter-network facilitation system 104. As shown, the computing device 602 displays a request interface 604 that includes interactive elements for generating and submitting a report of an issue with the debit transaction. For example, the request interface 604 is an interface that enables a user to view debit transactions (both pending and completed) within a graphical user interface and/or generate a report of an issue with the debit transaction. As shown, the request interface 604 includes interactive pending debit transaction and completed debit transaction elements. These pending debit transaction and completed debit transaction elements can be selected and a report of an issue with the debit transaction can be submitted to the pending debit dispute resolution system 106 by interacting with the dispute selection element 606. As shown in FIG. 6, by selecting the Joe's Coffee pending debit transaction and interacting with the dispute selection element 606, the computing device 602 can submit a reported issue communication to the pending debit dispute resolution system 106 for a pending debit transaction associated with an alleged debit purchase made at Joe's Coffee.

Figure 7:
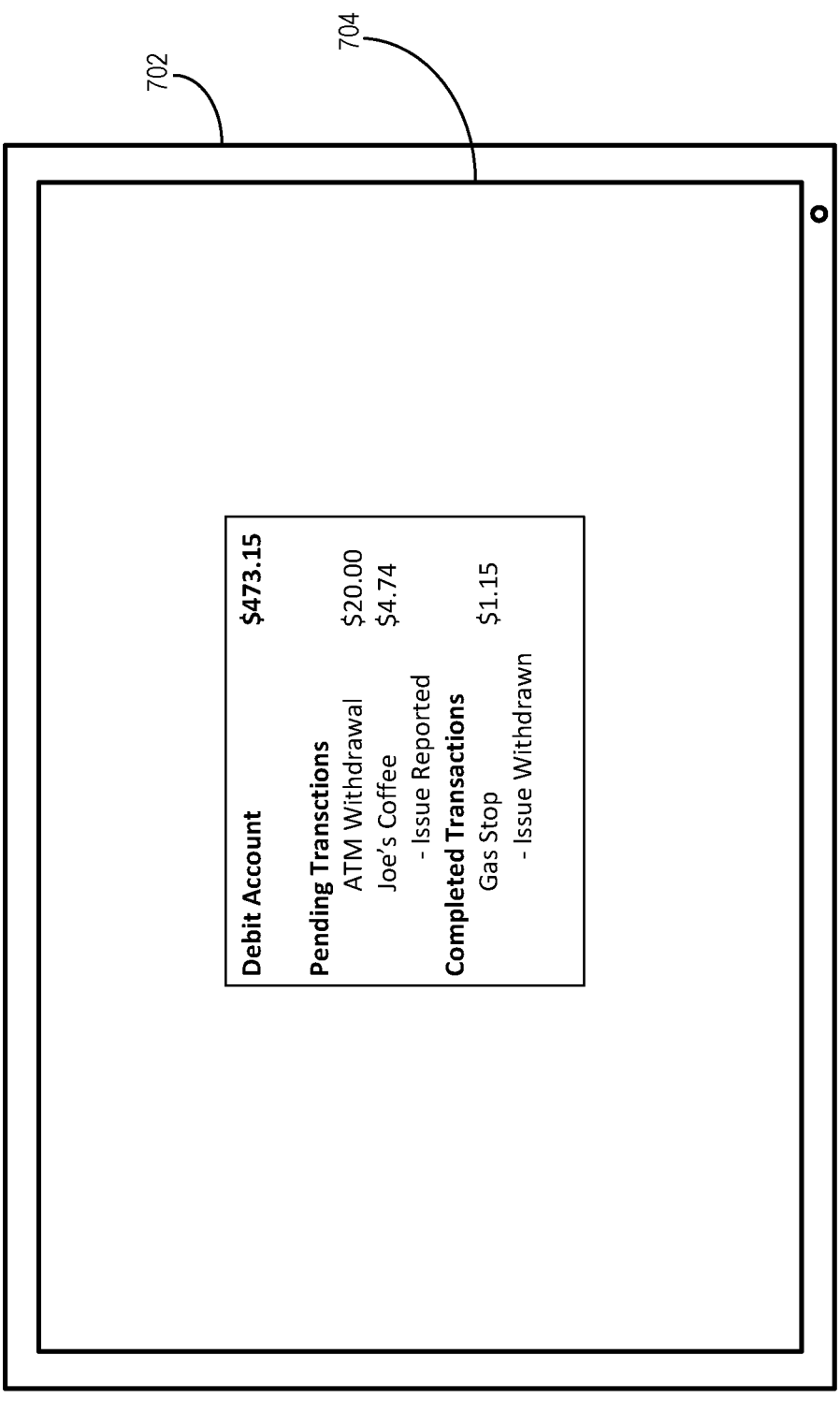
FIG. 7 illustrates an example administrator device user interface in accordance with one or more embodiments.

In some cases, the pending debit dispute resolution system 106 provides an interface whereby an administrator device (e.g., the administrator device(s) 116) can arrange or set up a report of an issue with the debit transaction. FIG. 7 illustrates an example administrator interface in accordance with one or more embodiments. As illustrated in FIG. 7, the computing device 702 is an administrator device for evaluating, monitoring, and managing issues with debit transactions within the inter-network facilitation system 104. As shown, the computing device 702 displays an administrator interface 704 that includes interactive elements for evaluating, monitoring, and managing reports of issues with debit transactions. For example, the administrator interface 704 is enables an administrator to view debit transactions (both pending and settled) within a graphical user interface and/or manage issues with debit transactions. As shown, the administrator interface 704 includes pending debit transaction and settled debit transaction elements. These pending debit transaction and settled debit transaction elements can be selected and a report of an issue with the debit transaction can be submitted to the pending debit dispute resolution system 106. As shown in FIG. 7, the administrator interface 704 can provide elements that display and allow interaction with withdrawn (or cancelled) issue reports as well as pending debit issue reports. Additionally, as shown in FIG. 7, by selecting the Joe's Coffee pending debit transaction and interacting with the element, the computing device 702 can manage the Joe's Coffee pending debit transaction (e.g., submit an issue report, view transaction details, withdraw an issue report).

The components of the pending debit dispute resolution system 106 can include software, hardware, or both. For example, the components of the pending debit dispute resolution system 106 can include one or more instructions stored on a computer-readable storage medium and executable by processors of one or more computing devices (e.g., the server device(s) 102, the client device(s) 118, the administrator device(s) 116, and/or the third-party server(s) 112). When executed by the one or more processors, the computer-executable instructions of the pending debit dispute resolution system 106 can cause a computing device to perform the methods described herein. Alternatively, the components of the pending debit dispute resolution system 106 can comprise hardware, such as a special purpose processing device to perform a certain function or group of functions. Additionally, or alternatively, the components of the pending debit dispute resolution system 106 can include a combination of computer-executable instructions and hardware.

Furthermore, the components of the pending debit dispute resolution system 106 performing the functions described herein may for example, be implemented as part of a stand-alone application, as a module of an application, as a plug-in for applications including content management applications, as a library function or functions that may be called by other applications, and/or as a cloud-computing model. Thus, the components of the pending debit dispute resolution system 106 may be implemented as part of a stand-alone application on a personal computing device or a mobile device. Alternatively, or additionally, the components of the pending debit dispute resolution system 106 may be implemented in any application that allows creation and delivery of financial and/or marketing content to users, including, but not limited to, various applications.

FIGS. 1-7, the corresponding text, and the examples provide a number of different systems, methods, and non-transitory computer readable media for generating and managing disputes for pending debit transactions. In addition to the foregoing, embodiments can also be described in terms of flowcharts comprising acts for accomplishing a particular result. For example, FIG. 8 illustrates a flowchart of an example sequence of acts in accordance with one or more embodiments.

While FIG. 8 illustrates acts according to some embodiments, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for generating and managing disputes for pending debit transactions utilizing a pending debit dispute resolution system 106. The series of acts 800 can include acts 810-840. The act 810 involves receiving a reported issue communication associated with a pending debit transaction. In particular, the act 810 comprises receiving, via a client device, a reported issue communication comprising an issue classification for a debit transaction that is in a pending state.

The series of acts 800 further includes an act 820 of monitoring a settlement computer network to identify a settlement for the pending debit transaction.

The series of acts 800 further includes an act 830 of comparing the settlement to the pending debit transaction corresponding to the reported issue communication. In particular, the act 830 comprises comparing the settlement and the debit transaction corresponding to the reported issue communication to determine a status change classification.

The series of acts 800 further includes an act 840 of selecting a dispute filing model. In particular, the act 840 comprises selecting a dispute filing model from a plurality of dispute filing models based on the issue classification and the status change classification.

In some embodiments, the series of acts 800 includes additional acts of determining the status change classification by comparing a feature of the settlement and a feature of the debit transaction corresponding to the reported issue communication to determine a negative status change classification; and selecting, based on the negative status change classification, a direct dispute filing model.

In some embodiments, the series of acts 800 includes additional acts of executing the direct dispute filing model by transmitting an additional dispute communication to a dispute computer network corresponding to the debit transaction.

In some embodiments, the series of acts 800 includes additional acts of determining the status change classification by comparing a feature of the settlement and a feature of the debit transaction corresponding to the reported issue communication to determine a positive status change classification; and selecting, based on the positive status change classification, a client confirmation dispute filing model.

In some embodiments, the series of acts 800 includes additional acts of executing the automated client confirmation dispute filing model by transmitting a confirmation request to the client device, the confirmation request indicating the positive status change classification.

In some embodiments, the series of acts 800 includes additional acts of executing the automated client confirmation dispute filing model by receiving a positive confirmation communication from the client device; and, in response to receiving the positive confirmation communication, providing a dispute communication to a dispute computer network corresponding to the debit transaction and providing a notification to the client device indicating that the dispute communication has been provided to the dispute computer network.

In some embodiments, the series of acts 800 may further comprise executing the client confirmation dispute filing model by receiving a negative confirmation communication from the client device; and, in response to receiving the negative confirmation communication, clear the issue classification corresponding to the debit transaction.

In some embodiments, the series of acts 800 includes additional acts of receiving, via an additional client device, an additional reported issue communication comprising an additional issue classification for an additional debit transaction that is in the pending state; and selecting a client confirmation dispute filing model from the plurality of dispute filing models based on the additional issue classification.

In some embodiments, the series of acts 800 may further comprise determining the status change classification by performing at least one of: comparing a purchase amount of the debit transaction corresponding to the reported issue communication and a purchase amount of the settlement; comparing a merchant name of the debit transaction corresponding to the reported issue communication and a merchant name of the settlement; or comparing a transaction purpose identifier of the debit transaction corresponding to the reported issue communication and a transaction purpose identifier of the settlement.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
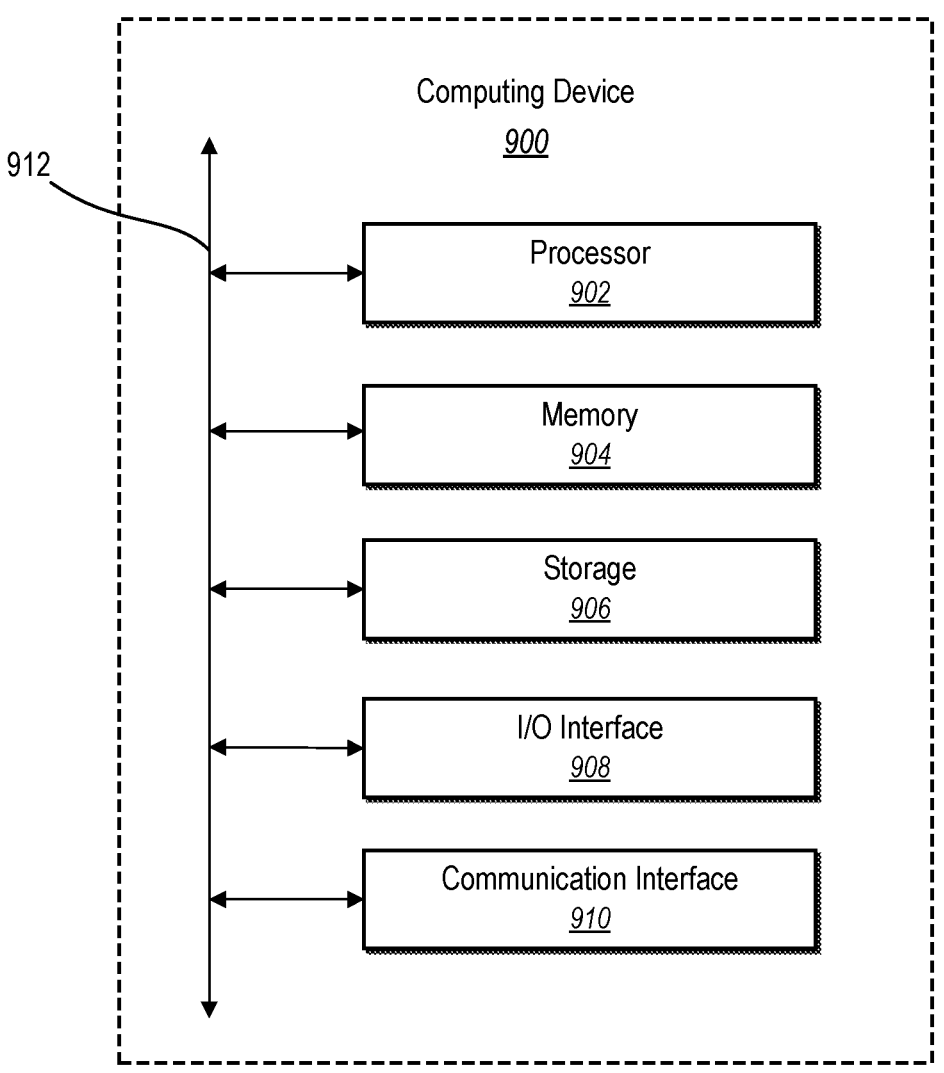
FIG. 9 illustrates a block diagram of a computing device for implementing one or more embodiments of the present disclosure.

FIG. 9 illustrates, in block diagram form, an exemplary computing device 900 (e.g., the client device(s) 118, the administrator device(s) 116, or the server device(s) 102) that may be configured to perform one or more of the processes described above. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output interface 908 (or "I/O interface 908"), which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that connects components of computing device 900 to each other.

Figure 10:
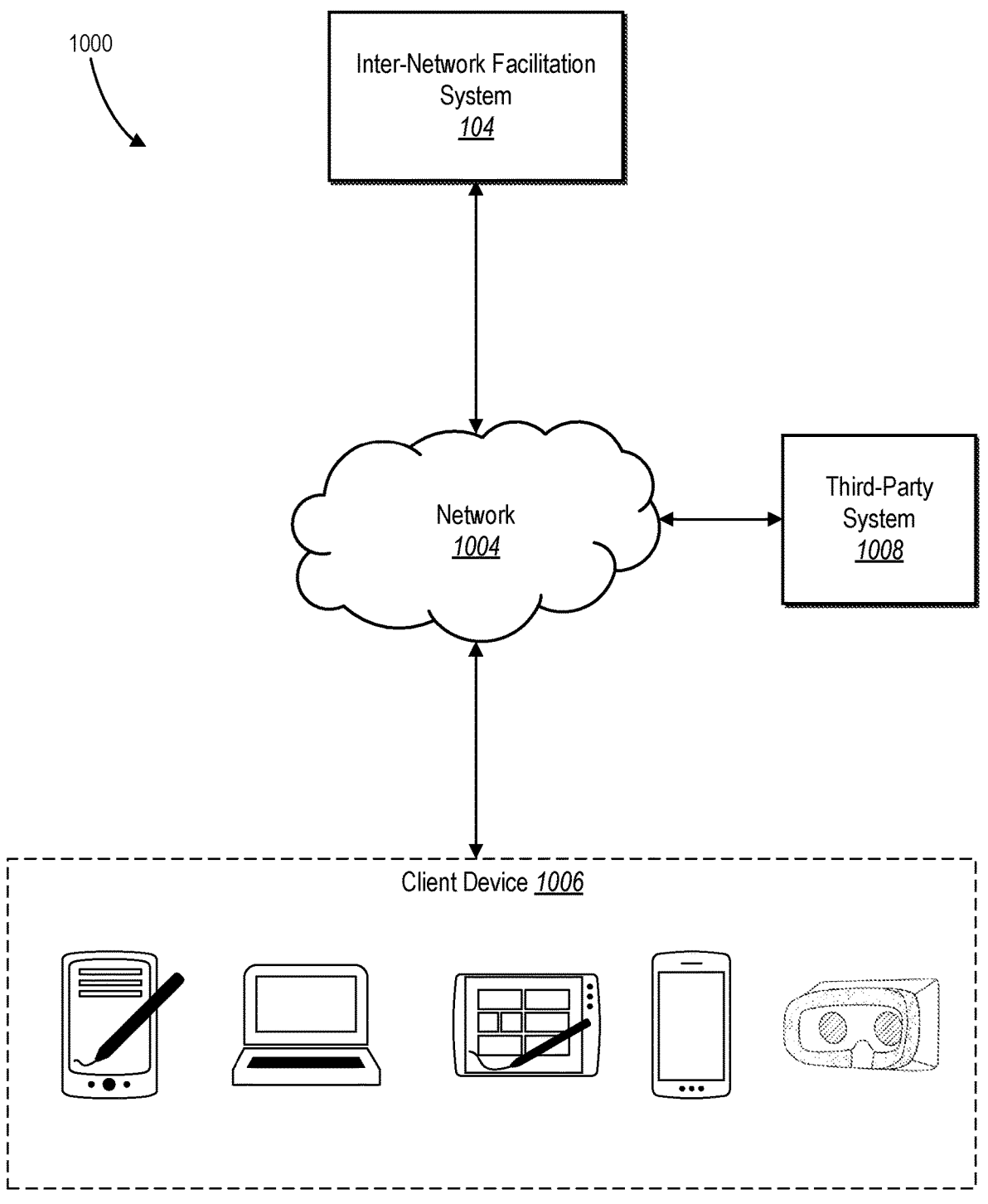
FIG. 10 illustrates an example environment for an internetwork facilitation system in accordance with one or more embodiments.

FIG. 10 illustrates an example network environment 1000 of the inter-network facilitation system 104. The network environment 1000 includes a client device 1006 (e.g., the client device 118 and/or administrator device(s) 116), an inter-network facilitation system 104, and a third-party system 1008 (e.g., the third-party server(s) 112) connected to each other by a network 1004. Although FIG. 10 illustrates a particular arrangement of the client device 1006, the inter-network facilitation system 104, the third-party system 1008, and the network 1004, this disclosure contemplates any suitable arrangement of client device 1006, the inter-network facilitation system 104, the third-party system 1008, and the network 1004. As an example, and not by way of limitation, two or more of client device 1006, the inter-network facilitation system 104, and the third-party system 1008 communicate directly, bypassing network 1004. As another example, two or more of client device 1006, the inter-network facilitation system 104, and the third-party system 1008 may be physically or logically co-located with each other in whole or in part.

Moreover, although FIG. 10 illustrates a particular number of client devices 1006, inter-network facilitation systems 104, third-party systems 1008, and networks 1004, this disclosure contemplates any suitable number of client devices 1006, inter-network facilitation system 104, third-party systems 1008, and networks 1004. As an example, and not by way of limitation, network environment 1000 may include multiple client devices 1006, inter-network facilitation system 104, third-party systems 1008, and/or networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, the inter-network facilitation system 104 (which hosts the pending debit dispute resolution system 106), and third-party system 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access network 1004. A client device 1006 may enable its user to communicate with other users at other client devices 1006.

In particular embodiments, the client device 1006 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1004) to link the third-party system 1008. For example, the inter-network facilitation system 104 may receive authentication credentials from a user to link a third-party system 1008 such as an online banking system to link an online bank account, credit account, debit account, or other financial account to a user profile within the inter-network facilitation system 104. The inter-network facilitation system 104 can subsequently communicate with the third-party system 1008 to detect or identify balances, transactions, withdrawal, transfers, deposits, credits, debits, or other transaction types associated with the third-party system 1008. The inter-network facilitation system 104 can further provide the aforementioned or other financial information associated with the third-party system 1008 for display via the client device 1006. In some cases, the inter-network facilitation system 104 links more than one third-party system 1008, receiving account information for accounts associated with each respective third-party system 1008 and performing operations or transactions between the different systems via authorized network connections.

In particular embodiments, the inter-network facilitation system 104 may interface between an online banking system and a credit processing system via the network 1004. For example, the inter-network facilitation system 104 can provide access to a bank account of a third-party system 1008 and linked to a user profile within the inter-network facilitation system 104. Indeed, the inter-network facilitation system 104 can facilitate access to, and transactions to and from, the bank account of the third-party system 1008 via a client application of the inter-network facilitation system 104 on the client device 1006. The inter-network facilitation system 104 can also communicate with a credit processing system, an ATM system, and/or other financial systems (e.g., via the network 1004) to authorize and process credit charges to a credit account, perform ATM transactions, perform transfers (or other transactions) between user profiles or across accounts of different third-party systems 1008, and to present corresponding information via the client device 1006.

In particular embodiments, the inter-network facilitation system 104 includes a model (e.g., a machine learning model) for approving or denying transactions. For example, the inter-network facilitation system 104 includes a transaction approval machine learning model that is trained based on training data such as user profile information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1008), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1000 either directly or via network 1004. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1004.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1006. Information may be pushed to a client device 906 as notifications, or information may be pulled from client device 1006 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 1008 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1004. A third-party system 1008 can communicate with the inter-network facilitation system 104 to provide financial information pertaining to balances, transactions, and other information, whereupon the inter-network facilitation system 104 can provide corresponding information for display via the client device 1006. In particular embodiments, a third-party system 1008 communicates with the inter-network facilitation system 104 to update account balances, transaction histories, credit usage, and other internal information of the inter-network facilitation system 104 and/or the third-party system 1008 based on user interaction with the inter-network facilitation system 104 (e.g., via the client device 1006). Indeed, the inter-network facilitation system 104 can synchronize information across one or more third-party systems 1008 to reflect accurate account information (e.g., balances, transactions, etc.) across one or more networked systems, including instances where a transaction (e.g., a transfer) from one third-party system 1008 affects another third-party system 1008.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, via a client device of an inter-network facilitation system, a reported issue communication for a debit transaction that is in a pending state;

generating, utilizing a machine learning model of the inter-network facilitation system, an issue classification from the reported issue communication;

monitoring a settlement computer network to identify a settlement comprising settlement features for the debit transaction;

comparing the settlement features and features of the debit transaction corresponding to the reported issue communication to determine a status change classification comprising a change between the settlement features and the features of the debit transaction;

selecting a direct dispute filing model from a plurality of dispute filing models based on a dispute confirmation probability for the issue classification based on the status change classification, wherein the plurality of dispute filing models comprising the direct dispute filing model and a client confirmation dispute filing model;

executing the direct dispute filing model by transmitting a dispute communication comprising a debit transaction dispute to a dispute computer network by transmitting signals to modify internal databases at a server device based on the issue classification from the reported issue communication; and transmitting a direct dispute notification to the client device for the reported issue communication comprising the status change classification;

generating, utilizing the machine learning model, an additional issue classification from an additional reported issue communication from an additional client device for an additional debit transaction that is in the pending state;

comparing additional settlement features and additional features of the additional debit transaction to determine an additional status change classification of the additional debit transaction;

selecting a client confirmation dispute filing model from the plurality of dispute filing models based on an additional dispute confirmation probability for the additional issue classification based on the additional status change classification;

executing the client confirmation dispute filing model by:

transmitting a confirmation request to the additional client device;

based on receiving a confirmation response from the additional client device in response to the confirmation request, transmitting an additional dispute communication comprising an additional debit transaction dispute to the dispute computer network by transmitting signals to modify the internal databases at the server device based on the additional issue classification from the additional reported issue communication; and transmitting a client confirmation dispute notification to the additional client device for the additional reported issue communication comprising the additional status change classification.

2. The computer-implemented method of claim 1, further comprising:

determining the status change classification by comparing a feature of the settlement and a feature of the debit transaction corresponding to the reported issue communication to determine a negative status change classification; and selecting, based on the negative status change classification, a direct dispute filing model.

3. The computer-implemented method of claim 1, wherein executing the direct dispute filing model by providing the dispute communication to the dispute computer network to modify internal databases at a server device further comprises modifying the internal databases at the server device to indicate that a transaction is disputed by the client device.

4. The computer-implemented method of claim 1, further comprising:

determining the additional status change classification by comparing a feature of an additional settlement and a feature of the additional debit transaction corresponding to the additional reported issue communication to determine a positive additional status change classification; and selecting, based on the positive additional status change classification, a client confirmation dispute filing model.

5. The computer-implemented method of claim 4, wherein transmitting the confirmation request to the additional client device further comprises transmitting the confirmation request to the additional client device indicating the positive additional status change classification.

6. The computer-implemented method of claim 5, further comprising, executing the client confirmation dispute filing model by:

receiving a positive confirmation communication from the additional client device; and in response to receiving the positive confirmation communication:

providing the dispute communication to the dispute computer network corresponding to the debit transaction; and providing the client confirmation dispute notification to the additional client device indicating that the dispute communication has been provided to the dispute computer network.

7. The computer-implemented method of claim 5, further comprising, executing the client confirmation dispute filing model by:

receiving a negative confirmation communication from the additional client device; and in response to receiving the negative confirmation communication, clear the additional issue classification corresponding to the additional debit transaction.

8. The computer-implemented method of claim 1, further comprising:

receiving, via an further client device, an further reported issue communication comprising an further client reported issue classification for an further debit transaction that is in the pending state; and selecting a client confirmation dispute filing model from the plurality of dispute filing models based on the further client reported issue classification.

9. The computer-implemented method of claim 1, further comprising determining the status change classification by performing at least one of: comparing a purchase amount of the debit transaction corresponding to the reported issue communication and a purchase amount of the settlement; comparing a merchant name of the debit transaction corresponding to the reported issue communication and a merchant name of the settlement; or comparing a transaction purpose identifier of the debit transaction corresponding to the reported issue communication and a transaction purpose identifier of the settlement.

10. A system comprising:

at least one processor; and a non-transitory computer readable medium storing instructions that, when executed by the at least one processor, cause the system to:

receive, via a client device on an inter-network facilitation system, a reported issue communication for a debit transaction that is in a pending state;

generate, utilizing a machine learning model of the inter-network facilitation system, an issue classification from the reported issue communication;

monitor a settlement computer network to identify a settlement comprising settlement features for the debit transaction;

compare the settlement features and features of the debit transaction corresponding to the reported issue communication to determine a status change classification comprising a change between the settlement features and the features of the debit transaction;

select a direct dispute filing model from a plurality of dispute filing models based on a dispute confirmation probability for the issue classification based on the status change classification, the plurality of dispute filing models comprising the direct dispute filing model and a client confirmation dispute filing model;

executing the direct dispute filing model by transmitting a dispute communication comprising a debit transaction dispute to a dispute computer network by transmitting signals to modify internal databases at a server device based on the issue classification from the reported issue communication; and transmitting a direct dispute notification to the client device for the reported issue communication comprising the status change classification;

generating, utilizing the machine learning model, an additional issue classification from an additional reported issue communication from an additional client device for an additional debit transaction that is in the pending state;

comparing additional settlement features and additional features of the additional debit transaction to determine an additional status change classification of the additional debit transaction;

selecting a client confirmation dispute filing model from the plurality of dispute filing models based on an additional dispute confirmation probability for the additional issue classification based on the additional status change classification;

executing the client confirmation dispute filing model by:

transmitting a confirmation request to the additional client device; and based on receiving a confirmation response from the additional client device in response to the confirmation request, transmitting an additional dispute communication that comprises an additional debit transaction dispute to the dispute computer network by transmitting signals to modify the internal databases at the server device based on the issue classification from the reported issue communication; and transmitting a client confirmation dispute notification to the additional client device for the reported issue communication comprising the additional status change classification.

11. The system of claim 10, further storing instructions that, when executed by the at least one processor, cause the system to:

determine the status change classification by comparing a feature of the settlement and a feature of the debit transaction corresponding to the reported issue communication to determine a negative status change classification; and select, based on the negative status change classification, the direct dispute filing model.

12. The system of claim 11, further storing instructions that, when executed by the at least one processor, cause the system to execute the direct dispute filing model by providing an further reported issue communication to a dispute computer network corresponding to the debit transaction.

13. The system of claim 10, further storing instructions that, when executed by the at least one processor, cause the system to:

determine the status change classification by comparing a feature of an additional settlement and a feature of the additional debit transaction corresponding to the additional reported issue communication to determine a positive additional status change classification; and select, based on the positive additional status change classification, the client confirmation dispute filing model.

14. The system of claim 13, further storing instructions that, when executed by the at least one processor, cause the system to execute the client confirmation dispute filing model by transmitting a confirmation request to the additional client device, the confirmation request indicating the positive additional status change classification.

15. The system of claim 14, further storing instructions that, when executed by the at least one processor, cause the system to execute the client confirmation dispute filing model by:

receiving a positive confirmation communication from the additional client device; and in response to receiving the positive confirmation communication:

providing the additional dispute communication to the dispute computer network corresponding to the debit transaction; and providing the client confirmation dispute notification to the additional client device indicating that the additional dispute communication has been provided to the dispute computer network.

16. The system of claim 14, further storing instructions that, when executed by the at least one processor, cause the system to execute the client confirmation dispute filing model by:

receiving a negative confirmation communication from the additional client device; and in response to receiving the negative confirmation communication, clear the additional issue classification corresponding to the additional debit transaction.

17. The system of claim 10, further storing instructions that, when executed by the at least one processor, cause the system to:

receive, via a further client device, an further reported issue communication comprising a further client reported issue classification for a further debit transaction that is in the pending state; and select the client confirmation dispute filing model from the plurality of dispute filing models based on the further client reported issue classification.

18. The system of claim 10, further storing instructions that, when executed by the at least one processor, cause the system to determine the status change classification by performing at least one of: comparing a purchase amount of the debit transaction corresponding to the reported issue communication and a purchase amount of the settlement; comparing a merchant name of the debit transaction corresponding to the reported issue communication and a merchant name of the settlement; or comparing a transaction purpose identifier of the debit transaction corresponding to the reported issue communication and a transaction purpose identifier of the settlement.

19. A non-transitory computer readable medium storing instructions that, when executed by at least one processor, cause a computing device to:

receive, via a client device on an inter-network facilitation system, a reported issue communication for a debit transaction that is in a pending state;

generate, utilizing a machine learning model of the inter-network facilitation system, an issue classification from the reported issue communication;

monitor a settlement computer network to identify a settlement comprising settlement features for the debit transaction;

compare the settlement features and features of the debit transaction corresponding to the reported issue communication to determine a status change classification comprising a change between the settlement features and the features of the debit transaction;

select a direct dispute filing model from a plurality of dispute filing models based on a dispute confirmation probability for the issue classification based on the status change classification, the plurality of dispute filing models comprising the direct dispute filing model and a client confirmation dispute filing model;

executing the direct dispute filing model by transmitting a dispute communication comprising a debit transaction dispute to a dispute computer network by transmitting signals to modify internal databases at a server device based on the issue classification from the reported issue communication; and transmitting a direct dispute notification to the client device for the reported issue communication comprising the status change classification;

generating, utilizing the machine learning model, an additional issue classification from an additional reported issue communication from an additional client device for an additional debit transaction that is in the pending state;

comparing additional settlement features and additional features of the additional debit transaction to determine an additional status change classification of the additional debit transaction;

selecting a client confirmation dispute filing model from the plurality of dispute filing models based on an additional dispute confirmation probability for the additional issue classification based on the additional status change classification;

executing the client confirmation dispute filing model by:

transmitting a confirmation request to the additional client device; and based on receiving a confirmation response from the additional client device in response to the confirmation request, transmitting an additional dispute communication that comprises an additional debit transaction dispute to the dispute computer network by transmitting signals to modify the internal databases at the server device based on the issue classification from the reported issue communication; and transmitting a client confirmation dispute notification to the additional client device for the reported issue communication comprising the additional status change classification.

20. The non-transitory computer readable medium of claim 19, further storing instructions that, when executed by the at least one processor, cause the computing device to:

determine the status change classification by comparing a feature of the settlement and a feature of the debit transaction corresponding to the reported issue communication to determine a negative status change classification; and select, based on the negative status change classification, the direct dispute filing model.

\* \* \* \* \*